Dec. 25, 1923.  
A. W. ELLIOTT  
1,478,643  
FISHING ROD TIP AND GUIDE FOR FISHING LINES  
Filed April 20, 1923
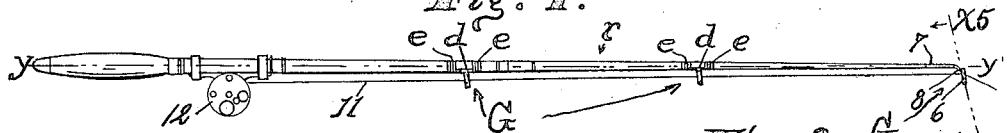
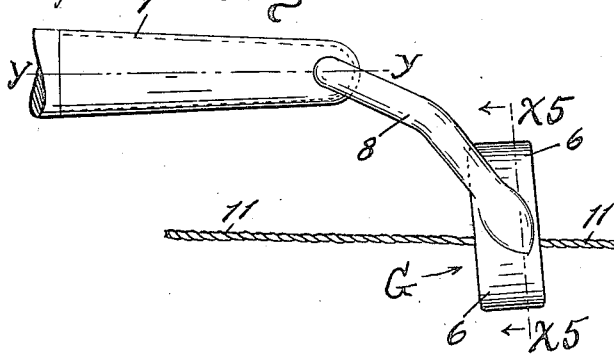
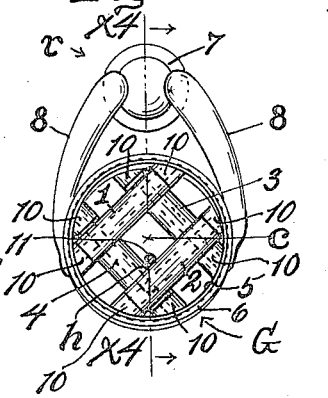
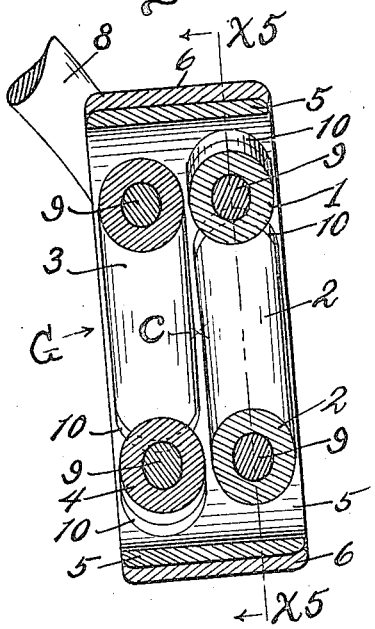
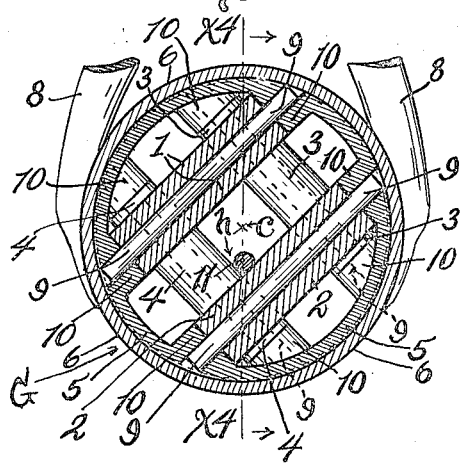
Inventor.  
Alah Wilton Elliott.  
by James R. Townsend  
his atty
Witness:  
W. M. Gautte.

Patented Dec. 25, 1923.

1,478,643

UNITED STATES PATENT OFFICE.

ALAH WILTON ELLIOTT, OF SANTA PAULA, CALIFORNIA.

FISHING-ROD TIP AND GUIDE FOR FISHING LINES.

Application filed April 20, 1923. Serial No. 633,442.

*To all whom it may concern:*

Be it known that I, ALAH WILTON ELLIOTT, a citizen of the United States, residing at Santa Paula, in the county of Ventura and State of California, have invented a new and useful Improvement in Fishing-Rod Tips and Guides for Fishing Lines, of which the following is a specification.

An object of this invention is to make provision whereby the draft of the fishing line will invariably be applied to hold the line in correct fishing position as it runs through the guide.

Another object is to provide an improved guide adapted to avoid wear on the running line.

In this invention I form a line run-way enclosed by four rollers which for either the top or bottom of the fishing rod are mounted eccentric to the axis of the rod; and said rollers are arranged obliquely to a plane intersecting the axis of the rod top and the center of the guideway.

The invention includes the construction above indicated and a specific arrangement whereby said construction is practically embodied.

An object is to avoid flattening the line, to avoid friction, and to keep the line in balance in all its positions.

Other objects, advantages and features of invention may appear from the accompanying drawing, the subjoined detail description and the appended claims.

The accompanying drawing illustrates the invention in one of the forms in which I have embodied it.

Figure 1 is a perspective side view of a rod provided with guides and a tip, constructed in accordance with this invention.

Fig. 2 is an enlarged side elevation of the tip.

Fig. 3 is an enlarged end view of the tip.

Fig. 4 is an enlarged fragmental section on line $x^4$, Figs. 3, 5.

Fig. 5 is an enlarged section on line $x^5$, Figs. 1 and 2.

G in a general way indicates the line guide irrespective of its location.

The appliance comprises four rollers 1, 2, 3 and 4 that are arranged in pairs in an inner ring 5 that is secured in an outer ring 6 which is eccentric to the ferrule $r$ of the rod tip and is connected to a sleeve 7 on said tip by the side arms 8.

The rollers are formed of sleeves that are mounted on pins 9 that are inserted through the ring 5; and bosses 10; the pins 1 and 2 being at right angles to the pins 3 and 4 and the pins and rollers are oblique to a plane intersecting the axis $y$ of the rod or ferrule $r$ and the center $c$ of the guideway.

The guides for the rod are constructed in substantially the same way as the guides for the tip; and are provided with bases $d$ that are secured to the rod in the usual manner, as by bands $e$.

By this construction and arrangement the line 11 from the reel 12 normally rests in the lower angle $h$ of the guides and tip, and any strain that causes deflection from that angle will bring the line into a corresponding angle of the line run-way.

The strain on the line will not tend to twist the line on the pole.

The construction shown is applicable either for fishing with the line on the top or under the rod.

The guides may be variously constructed in their mechanical details and I do not limit myself specifically to the construction shown in which the bosses project inwardly from the inner ring and are provided with holes arranged to receive the pins, said holes extending through the ring and bosses and the bosses being in four pairs, the adjacent ends of the corresponding pairs terminating in parallel planes corresponding to the ring. The pins are inserted through the inner ring, the sleeve rollers and the bosses and then the inner ring is inserted into the outside ring and is milled, soldered or otherwise firmly secured therein.

The sleeves form arcuate surfaces and such surfaces of the four sleeves arranged as shown form a line-way that is eccentric to the axis of the rod in each instance shown and by reason of the oblique arrangement shown the line is invariably rolled or condensed in an angle between two faces and toward a compact or cylindrical form as distinguished from being flattened, whenever strain is applied to the line to draw it against the guide.

I claim.

1. A fishing rod tip or guide having an eccentric line-way formed between and bounded by four arcuate surfaces, the axes of which are oblique to a plane intersecting the axis of the rod and the axis of said line-way.

2. A fishing rod tip or guide having an eccentric line-way formed between and bounded by four rollers, the axes of which are oblique to a plane intersecting the axis of the rod and the axis of said line-way.

3. A fishing rod tip or guide comprising a circular ring adapted to be attached to a rod; rollers carried by said ring, said rollers arranged to enclose a line run-way and positioned with their axes oblique to the longitudinal axis of the rod.

4. A fishing rod tip or guide comprising an outer ring adapted to be attached to a rod; an inner ring in said outer ring; rollers carried by said inner ring, said rollers arranged to enclose a line run-way and positioned with their axes oblique to the longitudinal axis of the rod.

5. A fishing rod guide comprising a ring adapted to be attached to a rod; rollers carried by said ring, said rollers arranged in parallel pairs and enclosing a line run-way and positioned with their axes oblique to the longitudinal axis of the rod.

6. A fishing rod guide comprising an outer ring adapted to be attached to a rod; an inner ring secured in said outer ring; rollers carried by said inner ring, said rollers arranged in parallel pairs and enclosing a line run-way and positioned with their axes oblique to the longitudinal axis of the rod.

7. A fishing rod tip comprising an outer ring adapted to be attached to a rod; an inner ring secured in said outer ring; pins secured to said inner ring; rollers on said pins, said pins and rollers positioned aslant to the longitudinal axis of the rod and arranged to enclose a line run-way.

8. A fishing rod tip comprising a sleeve secured to a rod; arms extending from said sleeve; an outer ring secured to said arms; an inner ring secured in said outer ring; pins secured in said inner ring; rollers on said pins, said pins and rollers being positioned with their axes oblique to the longitudinal axis of said rod and arranged to enclose a line run-way.

9. A fishing line guide or tip comprising an outer ring adapted to be attached to a rod; an inner ring secured in said outer ring; bosses on said inner ring; pins extending through and secured in said bosses; rollers loosely mounted on said pins said pins and rollers positioned to enclose a line run-way.

10. A fishing line guide or tip comprising an outer ring adapted to be attached to a rod and arranged aslant to the rod; an inner ring secured in said outer ring; bosses on the inner periphery of said inner ring; pins secured in said bosses; rollers loosely mounted on said pins, said pins and rollers positioned to enclose a square run-way for a line.

In testimony whereof, I have hereunto set my hand at Los Angeles, California, this 11th day of April, 1923.

ALAH WILTON ELLIOTT.

Witness:
JAMES R. TOWNSEND.